United States Patent [19]

Chia

[11] Patent Number: 5,678,185
[45] Date of Patent: *Oct. 14, 1997

[54] MOBILE RADIO HANDOVER DETERMINATION BASED ON RISE/FALL OF SIGNAL QUALITY AS A FUNCTION OF TIME

[75] Inventor: Si Tak Stanley Chia, Suffolk, England

[73] Assignee: British Telecommunications public limited company, London, England

[*] Notice: The term of this patent shall not extend beyond the expiration date of Pat. No. 5,491,834.

[21] Appl. No.: 504,070

[22] Filed: Jul. 19, 1995

Related U.S. Application Data

[62] Division of Ser. No. 81,291, filed as PCT/GB91/02290, Dec. 20, 1991, Pat. No. 5,491,834.

[30] Foreign Application Priority Data

Dec. 27, 1990 [GB] United Kingdom ............... 9028108

[51] Int. Cl.$^6$ ............................................. H04Q 7/22
[52] U.S. Cl. ........................... 455/33.2; 455/56.1; 379/60
[58] Field of Search ............................. 455/33.1, 33.2, 455/33.3, 33.4, 57.1, 57.2, 56.1, 67.1, 62, 226.1, 226.2; 379/60

[56] References Cited

U.S. PATENT DOCUMENTS

| | | | |
|---|---|---|---|
| 2,083,945 | 6/1937 | Evans | 324/179 |
| 3,157,876 | 11/1964 | Dickey, Jr. | 342/461 |
| 3,605,095 | 9/1971 | Higgins | 343/112 S |
| 3,653,049 | 3/1972 | Thayer et al. | 343/112 CA |
| 3,906,503 | 9/1975 | Stephens | 343/112 D |
| 4,502,052 | 2/1985 | Colby, Jr. | 343/458 |
| 4,556,760 | 12/1985 | Goldman | 179/2 EB |
| 4,718,081 | 1/1988 | Brenig | 455/33.3 X |
| 4,765,753 | 8/1988 | Schmidt | 379/60 |
| 4,829,519 | 5/1989 | Scotton et al. | 371/5 |
| 5,042,082 | 8/1991 | Dahlin | 455/33.2 |
| 5,055,849 | 10/1991 | Andersson et al. | 342/104 |
| 5,187,808 | 2/1993 | Thompson | 455/33.1 |
| 5,265,263 | 11/1993 | Ramsdale et al. | 455/33.2 |

FOREIGN PATENT DOCUMENTS

| | | |
|---|---|---|
| 3012484 | 10/1981 | Australia . |
| 0037070 | 10/1981 | European Pat. Off. . |
| 0236194 | 9/1987 | European Pat. Off. . |
| 0241954 | 10/1987 | European Pat. Off. . |
| 0454638 A1 | 10/1991 | European Pat. Off. . |
| 0455614 A1 | 11/1991 | European Pat. Off. . |
| 2621435 | 4/1989 | France . |
| 2849282 | 5/1980 | Germany . |
| 3215479A | 8/1988 | Germany . |
| WO 91/19403 | 12/1991 | WIPO . |
| WO 92/02105 | 2/1992 | WIPO . |

*Primary Examiner*—Reinhard J. Eisenzopf
*Assistant Examiner*—Philip J. Sobutka
*Attorney, Agent, or Firm*—Nixon & Vanderhye P.C.

[57] ABSTRACT

An intelligent mobile radio unit is served by one of a network of macrocells and microcells. The unit is arranged to monitor, for example, the signal strength or bit error ratio of signals transmitted from each of a set of candidate base stations of cells surrounding the serving base station based on the assessment of a running average of the rise/fall in signal quality, the unit is arranged to determine from a look-up table of stored templates of conditions for handover whether a handover between base stations and between macro- and microcells is appropriate.

18 Claims, 2 Drawing Sheets

MOBILE RADIO HANDOVER DETERMINATION BASED ON RISE/FALL OF SIGNAL QUALITY AS A FUNCTION OF TIME

This is a divisional of application Ser. No. 08/081,291, filed Aug. 27, 1993, now U.S. Pat. No. 5,491,834, which is a 371 of PCT/0891/02290 filed Dec. 20, 1991.

BACKGROUND OF THE INVENTION

1. Field of the Invention

This invention relates to handover determination between cells in a cellular radio system handling communications to and from a mobile unit.

2. Related Art

It is important that handover between cells in a cellular radio network is conducted approximately and reliably. In mixed cell environments comprising macrocells and overlying microcells, the usability of an established communication channel with a base station could be both noise and interference limited. As far as maintaining signal quality and the limitation of the effects of interference are concerned, it is possible to use dynamic channel assignment in all cells. However, to afford an appropriate level of reliability for a mobile unit on the move it is necessary to be able to perform intercell handover both reliably and at the appropriate time.

In a cellular radio system comprising both macrocells and overlying smaller microcells, a call to or from a mobile unit within the operating area of the system is handled by a base station for each cell. Whereas, a macrocell may be of a size covering a number of streets and extending for 1 or 2 kilometers in all directions, a microcell will often be about 200 to 500 meters long and may along extend linearly along a street, within the coverage area of a macrocell.

The handover between a microcell and a macrocell is subjected to special considerations. It is important for the system to be able to determine whether it is worthwhile effecting a handover of a mobile unit from a macrocell to a microcell as the latter is approached or between adjacent microcells. It may be that the mobile unit is going to enter the candidate microcell for a significant period, in which case a handover is beneficial, or relatively momentarily as the candidate microcell is crossed.

SUMMARY OF THE INVENTION

According to the present invention there is provided a handover determination system for a mobile radio network comprising a plurality of cells, each having associated with it a base station for supporting communications with a mobile unit, the system comprising:

(a) means for monitoring a quality of a signal respectively transmitted between each of a plurality of candidate base stations and the mobile unit;

(b) means for producing an indication of the rise or fall in the said quality; and (c) control means for initiating a handover from a serving base station, supporting communications with the mobile unit to another base station, on the basis of the rise/fall in the said quality of the signals associated with the plurality of candidate base stations being monitored.

Preferably, the mobile unit comprises the monitoring means and the producing means, the mobile unit further comprising signalling means for addressing the serving base station with an indication of the need for a handover to be initiated. The signalling means may be arranged to address the serving base station with an indication of the level of priority of a handover and/or with an indication of the possibility of a handover contingent upon the proceeding results of monitoring the quality of the transmitted signal. Advantageously, the monitored signal is transmitted from each mobile unit to the base station.

The monitored signal may be the received signal power. However, in digital communications systems the bit error ratio can be used.

Preferably, the control means are arranged to instruct the monitoring means to monitor a set of signals, each signal being distinctive of one of the corresponding set of base stations, the composition of the set being defined in accordance with the identity of the serving base station. In particular, each signal in the set of signals may distinguish a respective base section by the frequency of the signal.

In one particular form of the invention, the indication producing means include a quality decrement/increment estimator which is arranged to determine the rise or fall in the quality from the calculation of the running average of the indications. There may also be provided means for storing templates of changes in signal quality and/or rates of change thereof, the control means are arranged to initiate a handover based at least partially on the recognition of a substantial match between the incoming signal and a template.

The invention also extends to a handover determination method for a mobile radio network comprising a plurality of cells, each having associated with it a base station for supporting communications with a mobile unit, the method comprising:

(a) monitoring a quality of a signal respectively transmitted between each of a plurality of candidate base stations and the mobile unit;

(b) producing an indication of the rise or fall in the said quality; and (c) initiating a handover from a serving base station supporting communication with the mobile unit, to another base station on the basis of the rise/fall in the said quality of the signal associated with the plurality of candidate base stations being monitored.

Furthermore, the invention also extends to a mobile unit for a mobile radio system, the mobile unit comprising means for receiving a plurality of signals each respectively transmitted by one of a set of candidate base stations; means for monitoring a quality of the signal; means for producing an indication of the rise or fall in the said quality; and signalling means for transmitting to a serving base station supporting communication with the mobile unit, a signal indicating the need for a handover to a candidate base station on the basis of the rise/fall in the said quality of the signals associated with the plurality of candidate base stations being monitored.

The rise or fall in the quality being monitored may be interpreted to derive an indication of the need for a handover based on the likelihood of the serving base station and each of the candidate base stations being able to support communication, preferably for a substantial duration which would make handover worthwhile.

BRIEF DESCRIPTION OF THE DRAWINGS

The invention can be put into practice in various ways, one of which will now be described by way of example with reference to the accompanying drawings in which.

DETAILED DESCRIPTION OF EXEMPLARY EMBODIMENTS

The embodiment of the invention includes an intelligent mobile unit which is able to monitor intensively the strength of signals transmitted from adjacent microcell base stations in addition to a serving microcell or macrocell base station. If the serving cell is a microcell which has a boundary in common with a parent macrocell, the adjacent macrocell base station is also monitored by the mobile unit.

The invention utilises an assessment of the variation in signal quality, e.g. received power level or bit error ratio, of a signal transmitted between each target microcell and possibly an adjacent macrocell, which are candidates for a handover, and the mobile unit which is served by a currently serving microcell or macrocell.

Figure 1:
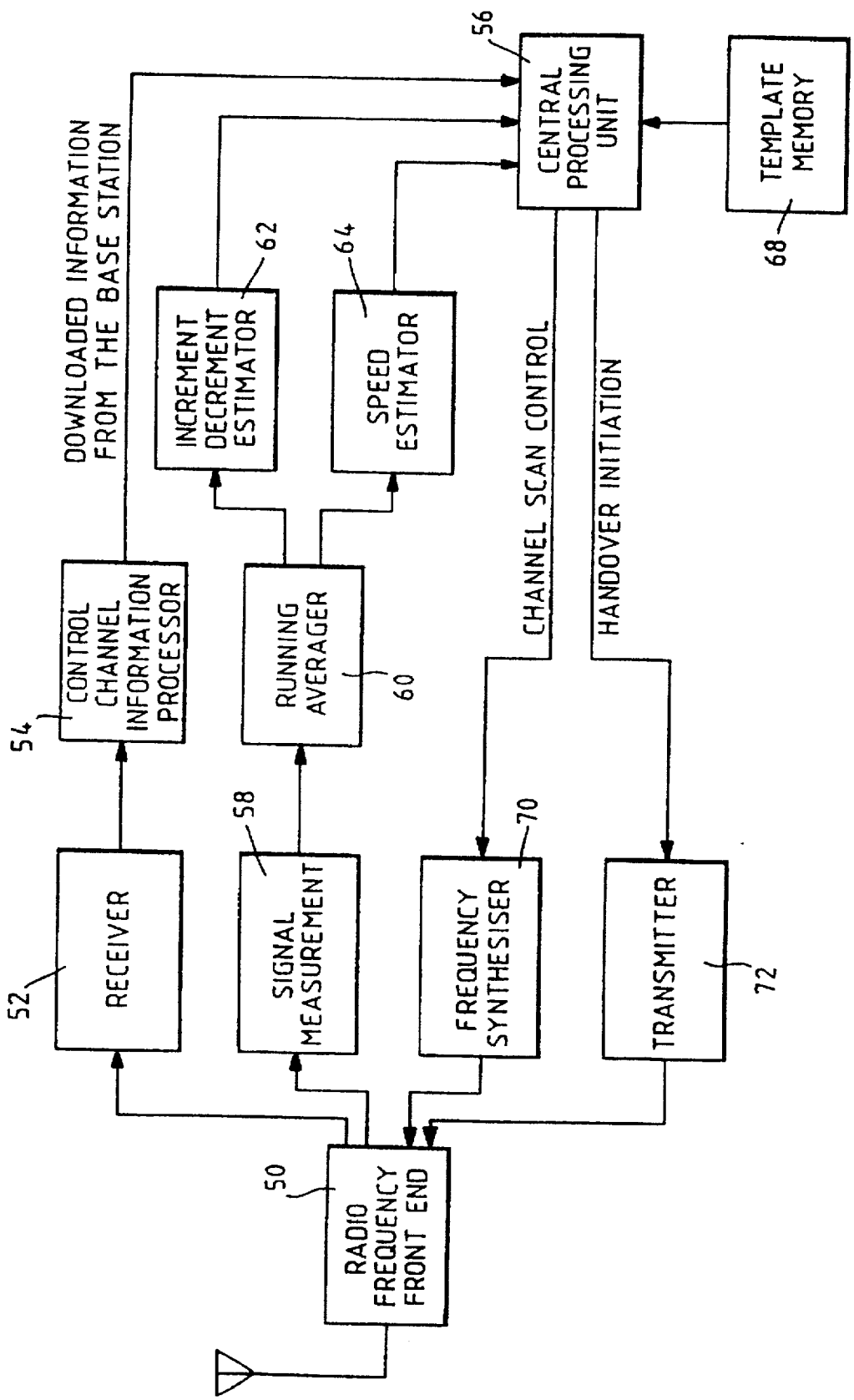
FIG. 1 is a clock diagram of an intelligent mobile unit for use in the invention.

Referring to FIG. 1 the intelligent mobile unit is used to monitor the signals received from the serving and target base stations as well as to transmit handover initiation commands.

The transmitted signals are relayed from a transmitter (the base station) to the receiver (mobile unit) radio frequency front end 50 to be processed by a pair of receiving circuits.

On the one hand, the received signal is passed from the radio frequency front-end 50 to a receiver unit 52 arranged to derive the control channel information from the incoming signal transmitted from the serving base station. The basic information is then applied to a control channel information processor 54. The processor 54 demodulates and decodes the control channel information for use by a central processing unit 56. The processed information is then used by the central processing unit 56 in the handover determination. This is described below.

On the other hand, the received signal from each of the serving and target base stations is also relayed from the radio frequency front end 50 to a signal measurement unit 58 which provides a measurement of signal quality. The unit 58 may be, for example, a received signal strength indication or bit error rate counter.

A running average is then determined of the indication or count by a running averager 60. The averaging serves to smooth out transients. A determination of the trend in the signal quality is then derived by an increment/decrement estimator 62 from the averaged signal. The averaged signal is also used by a speed estimator 64 to provide an estimation of the absolute speed of the mobile unit.

The information from the control channel information processor, the increment/decrement estimator and the speed estimator is sent to the central processing unit 56. The central processing unit uses the control channel information downloaded from the serving base station to determine the monitoring algorithm to be adopted according to the type and location of the cells in and around which the mobile unit is located.

The trend in signal quality, the speed estimation, a lookup table 68 of signal quality templates and the control channel information downloaded from the base station, are used to determine whether a handover is appropriate and, if so, whether it should be on an intracell or an intercell basis.

The central processing unit 56 controls a frequency synthesizer 70 associated with the radio frequency front end to scan the channel set of frequencies used by the serving and target base stations in order to perform signal level measurements, and to control the transmission and reception of signals.

The processing unit also controls the operation of a transmitter 72 arranged to transmit handover initiation information via the radio frequency front end 50, to the serving base station.

Each base station in a cellular radio system according to the invention transmits a signal identifying the base station specifically. Each time the mobile unit is handed over from, say, a macrocell to a microcell or between microcells, a new set of carrier frequencies to be monitored and a new algorithm for addressing adjacent candidate base stations, in order that their signal levels can be monitored is downloaded from the newly appointed serving base station. Each algorithm sets out the frequencies to be monitored and the look-up table of signal level increment/decrement gradient templates. Each template is associated with a mobile unit moving at a particular speed towards or away from the various monitored base stations.

As will be shown below, in many cases the detection of a rise or fall in signal power level received from a particular base station is sufficient in which to base a hangover decision in conjunction with the conventional criteria determining handover, i.e. signal level thresholds and hysteresis, the latter causing a delay after the threshold is passed to ensure that the change in signal level is not simply a momentary phenomenon. However, there are also situations in which it is necessary to know the rate of change of signal levels in relation to the speed of the mobile unit in order to determine whether a handover is appropriate or not.

In our co-pending British Patent Application No. 9016341.1 filed on 25th Jul. 1900, (U.S. application Ser. No. 08/030,205 filed Mar. 11, 1993, now U.S. Pat. No. 5,396, 253) there is described a speed estimator which can be adapted to provide an assessment of the speed of a mobile unit in a cellular radio system based on filtered received signals. As also described in that application, the speed estimator can be adapted to provide an increment/decrement indication from the running average of vehicle speed.

Figure 2:
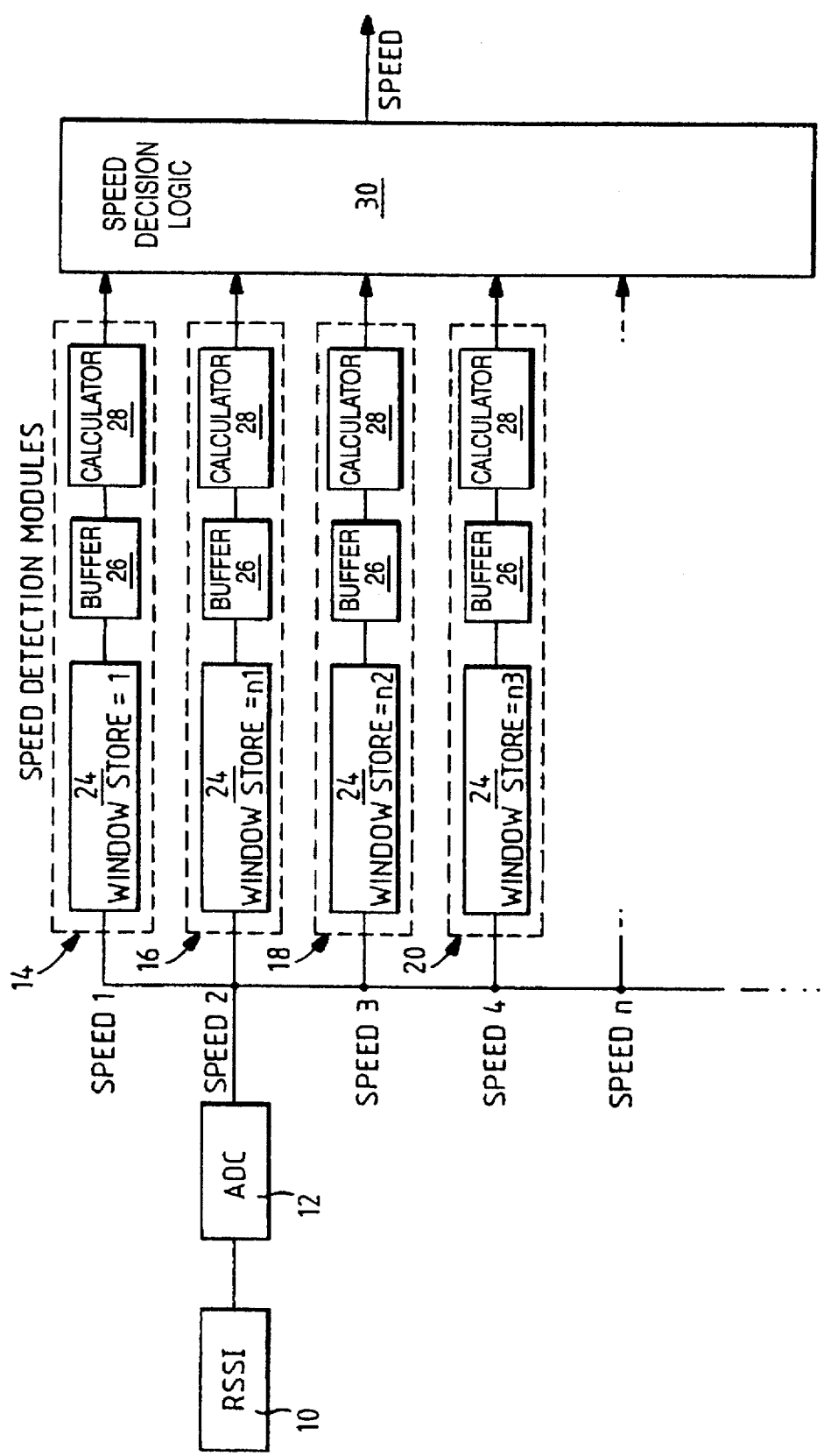
FIG. 2 is a clock diagram of a speed estimator for use in the invention.

Such a speed estimator is shown in FIG. 2. It consists of a received signal strength indicator circuit 10 which outputs a voltage level signal proportional to the received signal power to an analogue-to-digital converter 12 (ADC). The sampling rate of the ADC 12 is determined by the averaging window duration to the highest required speed. The highest speed to be determined is 40 m/s and as 100 samples are required to determine a running average, a sampling rate of 1.7 kHz is required (i.e. 100 samples per 60 ms). A rounded sampling rate of 2 kHz may be applied.

In FIG. 2, the digital data from the ADC 12 is fed in parallel to a number of speed detection modules comprising averaging units 14 to 20 each with an averaging window of a different duration (1, n1, n2, n3, etc.). The output from each of the averaging windows is input via an average-buffer 26 into a variance calculator 28 before being fed to speed decision logic 30.

The averaging unit 14 with a window of 1 sample is equivalent to the instantaneous signal level. A running average can be calculated at each clock cycle where a new sample value is fed in parallel to all the averaging units 14 to 22. The estimator will not be operational until all the averaging units and the buffers 26 are filled with samples. Thus, the time delay for the system to be operational is equivalent to the size of the largest averaging window (n3) plus the average-buffer-size. The size of the buffer 26 is usually small, eg 10 samples. Thus, the majority of the time delay is taken up with filling the largest averaging unit n3. For instance, if the largest averaging unit n3 is for averaging over 3 seconds, then the system will have a time delay of approximately 3 seconds plus a short time to load the buffer 26.

This speed estimator can be implemented in hardware and/or software and the number of speeds can be estimated by implementating a multiple number of basic speed detection modules.

The increment/decrement heading estimator is an extension of the speed estimator. The values stored in the average-buffers could be easily manipulated by software to return either a majority logic vote for the underlying trend or the slope of the running average.

The mobile unit is able to base a handover decision on an assessment of mobile unit received signal power level indications from 2 or more adjacent candidate base stations. Alternatively, the mobile unit may be arranged to alert the current serving base station of the desirability of a handover. It will be appreciated by the skilled person that any suitable assessment of signal quality could be used in place of or in combination with received signal levels. As one example, the bit error ratio could be used when a digital information signal is transmitted by the base stations. As another example signal delay testing (timing advance) can be used to determine the distance of the mobile unit from a base station. Whatever assessment is adopted, the result is used in a determination of the mobile unit heading relative to each of the candidate base stations.

When the mobile unit is monitoring signals transmitted from candidate base stations, various scenarios for a given serving base station will be used to determine the appropriateness of handover. These scenarios will form a set of condition templates, the constituents of which will be specific to a particular serving base station. However, there are various predictable scenarios which can be defined in general terms:

1. If a mobile unit is served as a microcell and the signal levels from both the serving microcell base station and candidate microcell base station are decreasing as indicated by the increment/decrement estimator this implies that the mobile unit is leaving the serving microcell via a side road and handover from the serving microcell to the parent macrocell should be initiated straight away.

2. By contrast, if a mobile unit is served by the macrocell and the mobile unit detects the signal levels from 2 adjacent microcell base stations (established, for example, in line along the same street) are increasing simultaneously, this indicates that the mobile unit is approaching an area served by microcells. In this situation a handover operation may potentially be required. However, only a standby flag is set to warn the system including the current serving and the target base stations or to raise the priority of access for the mobile unit to the microcell system. No handover execution is effected until further information is obtained.

3. After the above warning flag has been set, if the signal levels monitored by the mobile unit change from both increasing to one increasing while the other is decreasing at a pre-defined rate, this implies that the mobile unit is within the service area of one of the microcells. Handover from the serving macrocell to the microcell in which the mobile unit is adjudged to be, i.e. is identified by the increasing signal level, should be executed immediately. The success of the handover will only depend on the availability of a channel in the microcell base station.

4. When a mobile unit is traveling within the area served by the microcell, the previous scenario also serves as a confirmation that the mobile unit remains within it and that the handover to the microcell was appropriate.

5. If when the mobile unit is served by the microcell, it fails to locate another microcell base station with increasing signal levels, then a handover to a macrocell must be initiated. This will occur when a mobile unit has entered the outer cell of a microcell sub-network and is about to exit from it. The outer cell is typically constituted by the last microcell in a street.

6. However, when the mobile unit is in a macrocell and the signal level from microcell base station is on the increase, this indicates that the mobile unit is approaching that microcell. In this situation a handover from the macrocell to the candidate microcell should be initiated. It must be noted that in this situation the rate of increase in relation to the vehicle speed must also be assessed. This is to distinguish proper entry into a microcell from a situation where the mobile unit is merely crossing the candidate microcell. If the rate of increase detected is steeper than the limit represented by normal approach, a delay factor should be built-in before initiating the handover. This will allow handover only if the signal level continues to increase during the delay, indicating that the mobile unit has turned into the microcell rather than subsequently crossed it.

7. For a 3 microcell merging situation if the signal levels if 2 microcell base stations are decreasing and the third one if increasing, this implies that the mobile unit is leaving the microcell sub-network extending along one road and is likely to join the microcell sub-network extending along a branching or parallel road.

The implementation or the proposed handover processing techniques requires an intelligent mobile radio receiver which has the capabilities of processing running averages and of monitoring the signal level variations. In addition it must also be able to store all the pre-defined handover condition templates and the information downloaded from a base station after handover has been affected, and the information containing instructions on the monitoring carrier frequencies for adjacent candidate base stations which are to be monitored while the mobile unit is in that serving cell.

I claim:

1. A handover determination system for a mobile radio network including a plurality of cells, each cell having associated with it a base station for supporting communications with a mobile unit, the system comprising:

means for monitoring a quality of a signal respectively transmitted between each of a plurality of candidate base stations and the mobile unit;

means for producing an indication of the rate of rise or fall in the said quality as a function of time; and control means for initiating a handover from a serving base station, supporting communications with the mobile unit, to another base station, the decision as to whether a handover should be initiated being based on the rate of rise/fall as a function of time in the said quality of the signals associated with the plurality of candidate base stations being monitored, wherein the rate of rise/fall as a function of time in the quality of a signal is an indication of a base station being able/unable to support communication for a substantial duration.

2. A system as in claim 1, in which the mobile unit comprises the means for monitoring and the means for producing, the mobile unit further comprising signalling means for addressing the serving base station with an indication of the need for a handover to be initiated.

3. A system as in claim 1, in which the monitored signal is transmitted from each mobile unit to the base station.

4. A system as in claim 1, in which the monitored quality of the signal is the received signal power or the bit error ratio.

5. A system as in claim 1, in which the means for producing an indication include a quality decrement/ increment estimator which is arranged to determine the rise or fall in the quality from the calculation of the running average of the indications.

6. A system as in claim 1, in which the control means are arranged to instruct the means for monitoring to monitor a set of signals, each signal being distinctive of one of a corresponding set of candidate base stations, the composition of the set of candidate base stations being defined in accordance with the identity of the serving base station.

7. A system as in claim 6, in which each signal in the set of signals distinguishes a respective base station by the frequency of the signal.

8. A handover determination system for a mobile radio network including a plurality of cells, each cell having associated with it a base station for supporting communications with a mobile unit, the system comprising:

means for monitoring a quality of a signal respectively transmitted between each of a plurality of candidate base stations and the mobile unit;

means for producing an indication of the rate of rise or fall in the said quality as a function of time; and control means for initiating a handover from a serving base station, supporting communications with the mobile unit, to another base station, the decision as to whether a handover should be initiated being based on the rate of rise/fall as a function of time in the said quality of the signals associated with the plurality of candidate base stations being monitored;

said mobile unit including the means for monitoring and the means for producing, the mobile unit further comprising signalling means for addressing the serving base station with an indication of the need for a handover to be initiated; and said signalling means being arranged to address the serving base station with an indication of the level of priority of a handover and/or with an indication of the possibility of a handover contingent upon the preceding results of monitoring the quality of the transmitted signal, wherein the rate of rise/fall as a function of time in the quality of a signal is an indication of a base station being able/unable to support communication for a substantial duration.

9. A handover determination system for a mobile radio network including a plurality of cells, each cell having associated with it a base station for supporting communications with a mobile unit, the system comprising:

means for monitoring a quality of a signal respectively transmitted between each of a plurality of candidate base stations and the mobile unit;

means for producing an indication of the rise or fall in the said quality as a function of time; and control means for initiating a handover from a serving base station, supporting communications with the mobile unit, to another base station, the initiation being based on the size of the areas of coverage served by the base stations, relative to the speed of the mobile unit, as determined by the rise/fall as a function of time in the said quality of the signals associated with the plurality of candidate base stations being monitored.

10. A system as in claim 9, in which the mobile unit comprises the means for monitoring and the means for producing, the mobile unit further comprising signalling means for addressing the serving base station with an indication of the need for a handover to be initiated.

11. A system as in claim 9, in which the monitored signal is transmitted from each mobile unit to the base station.

12. A system as in claim 9, in which the monitored quality of the signal is the received signal power or the bit error ratio.

13. A system as in claim 9, in which the control means are arranged to instruct the means for monitoring to monitor a set of signals, each signal being distinctive of one of a corresponding set of candidate base stations, the composition of the set of candidate base stations being defined in accordance with the identity of the serving base station.

14. A system as in claim 13, in which each signal in the set of signals distinguishes a respective base station by the frequency of the signal.

15. A system as in claim 9, in which the means for producing an indication include a quality decrement/ increment estimator which is arranged to determine the rise or fall in the quality from the calculation of the running average of the indications.

16. A system as in claim 9 wherein the rise/fall as a function of time in the quality of a signal is an indication of a base station being able/unable to support communication for a substantial duration.

17. A handover determination system for a mobile radio network including a plurality of cells, each cell having associated with it a base station for supporting communications with a mobile unit, the system comprising:

means for monitoring a quality of a signal respectively transmitted between each of a plurality of candidate base stations and the mobile unit;

means for producing an indication of the rise or fall in the said quality as a function of time; and control means for initiating a handover from a serving base station, supporting communications with the mobile unit, to another base station, the initiation being based on the size of the areas of coverage served by the base stations, relative to the speed of the mobile unit, as determined by the rise/fall as a function of time in the said quality of the signals associated with the plurality of candidate base stations being monitored;

said mobile unit including the means for monitoring and the means for producing, the mobile unit further comprising signalling means for addressing the serving base station with an indication of the need for a handover to be initiated; and said signalling means being arranged to address the serving base station with an indication of the level of priority of a handover and/or with an indication of the possibility of a handover contingent upon the preceding results of monitoring the quality of the transmitted signal.

18. A handover determination system as in claim 17 wherein the rise/fall as a function of time in the quality of a signal is an indication of a base station being able/unable to support communication for a substantial duration.

* * * * *